J. Collines,
Fish Seine,
Nº 80,274.    Patented July 28, 1868.
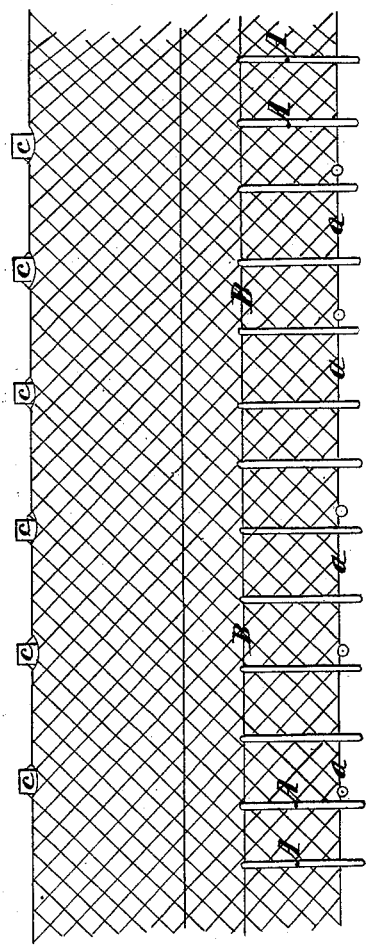
Witnesses:
Inventor:
John Collins

United States Patent Office.

JOHN COLLINES, OF ECORSE, MICHIGAN.

Letters Patent No. 80,274, dated July 28, 1868; antedated July 18, 1868.

IMPROVEMENT IN FISHING-SEINES.

*The Schedule referred to in these Letters Patent and making part of the same.*

TO ALL WHOM IT MAY CONCERN:

Be it known that I, JOHN COLLINES, of the town of Ecorse, county of Wayne, and State of Michigan, have invented a new and useful Improvement on a Fishing-Seine, called "The Collins Brace-Seine;" and I do hereby declare that the following is a full, clear, and exact description of the construction and operation of the same, reference being had to the annexed drawings, making a part of this specification.

I construct a net or seine generally similar to those now in use, and of any size desired. Along the entire length of this seine I insert perpendicular braces of wood, (marked A A in the drawings,) from two and a half to six feet in length, and at intervals from each other about equal to their length. These braces extend from two to four inches below the lead-line, (marked $a$ in the drawings,) and are fastened to it at their bottoms, and at their tops they are fastened to a brace-line, (marked B in the drawings,) extending the whole length of the seine.

The seine is provided with leads on the lower or lead-line, (marked $a$, as above,) and with floats on the upper line (marked $c\ c$ in the drawings) of the seine.

This net is cast into the water, and worked or operated similar to the ordinary seines. It possesses many and great advantages over the seines now in use, among which are the following:

It enables the fisherman to go anywhere over the water, without reference to the shore, and thereby to select his own fishing-ground, and to choose those localities where he may have learned that fish are most plenty.

The braces marked A A, as above, prevent the seine being entangled, fouled, or caught upon any stones, rocks, logs, or other obstructions, and allow the fisherman the opportunity of fishing in places where the seines now in use would be destroyed by rocks and obstructions.

What I claim as my invention, and desire to secure by Letters Patent, is—

The application of the braces marked A A, as above, to a seine or net, substantially as and for the purposes herein described.

JOHN COLLINES.

Witnesses:
  HENRY H. SWAN,
  HENRY U. DUFFIELD.